US00RE50446E

(19) United States
(12) Reissued Patent
Kruse et al.

(10) Patent Number: US RE50,446 E
(45) Date of Reissued Patent: Jun. 3, 2025

(54) CONTROL KNOB

(71) Applicant: Peloton Interactive, Inc, New York, NY (US)

(72) Inventors: Mark Kruse, Brooklyn, NY (US); Jason Poure, Hastings on Hudson, NY (US); Nigel John Alcorn, Brooklyn, NY (US); Lee Hendrickson, Brooklyn, NY (US)

(73) Assignee: Peloton Interactive, Inc., New York, NY (US)

(21) Appl. No.: 29/932,940

(22) Filed: Mar. 15, 2024

Related U.S. Patent Documents

Reissue of:
(64) Patent No.: Des. 946,097
Issued: Mar. 15, 2022
Appl. No.: 29/758,470
Filed: Nov. 16, 2020

U.S. Applications:
(62) Division of application No. 29/724,262, filed on Feb. 13, 2020, now Pat. No. Des. 902,332, which is a
(Continued)

(51) LOC (15) Cl. ..... 21-02
(52) U.S. Cl.
USPC ..... D21/694; D21/669
(58) Field of Classification Search
USPC ..... D21/662, 668, 669, 670, 671, 694, 800; D8/107, 300, 301, 307, 310, 311, 312; D23/250, 421
(Continued)

(56) References Cited

U.S. PATENT DOCUMENTS 3,642,279 A 2/1972 Cutter
5,018,722 A 5/1991 Whitmore
(Continued)

FOREIGN PATENT DOCUMENTS

WO WO2010107632 A1 9/2010
WO WO2010107840 A1 9/2010
WO WO2014160057 A2 10/2014

OTHER PUBLICATIONS

Sydney Kaiser. "Peloton Tread+ Treadmill Review—Pros & Cons (2024)." Treadmill Review Guru., Apr. 12, 2024 [online], [retrieved on Jun. 24, 2024]. Retrieved from the Internet <URL: https://www.treadmillreviewguru.com/peloton-tread-plus-review/>.*
(Continued)

*Primary Examiner* — Darlington Ly
(74) *Attorney, Agent, or Firm* — Haynes and Boone, LLP

(57) CLAIM

The ornamental design for a [set of control knobs] *control knob*, as shown and described.

DESCRIPTION

FIG. 1 is a front perspective view of a [set of control knobs in which environment comprising a treadmill is disclaimed] *control knob*;
FIG. 2 is a back perspective view thereof;
FIG. 3 is a front view thereof;
FIG. 4 is a back view thereof;
FIG. 5 is a left-side view thereof;
FIG. 6 is a right-side view thereof;
FIG. 7 is a top view thereof;
FIG. 8 is a bottom view thereof;
FIG. 9 is an enlarged front perspective view of one of the control knobs[with the disclaimed environment removed for clarity of disclosure]. The claimed design includes the mirror image of the control knob depicted that is not shown;
FIG. 10 is an enlarged back perspective view thereof;
FIG. 11 is an enlarged top view thereof;
FIG. 12 is an enlarged bottom view thereof;
FIG. 13 is an enlarged left-side view thereof. The expanded right-side view is identical to the expanded left-side view; and,
FIG. 14 is an enlarged front view thereof.
(Continued)

AMENDED

*FIG. 15 is front perspective view of a control knob;*
*FIG. 16 is a back perspective view thereof;*
*FIG. 17 is a front view thereof;*
*FIG. 18 is a back view thereof;*
*FIG. 19 is a left-side view thereof;*
*FIG. 20 is a right-side view thereof;*
*FIG. 21 is a top view thereof; and*
*FIG. 22 is a bottom view thereof.*

The broken lines [depict portions of the treadmill or portions thereof and/or environment of the treadmill or portions thereof which] *in the drawings illustrate portions of an environmental treadmill and portions of control knob that* form no part of the claimed design.

1 Claim, 22 Drawing Sheets

Figure 2:
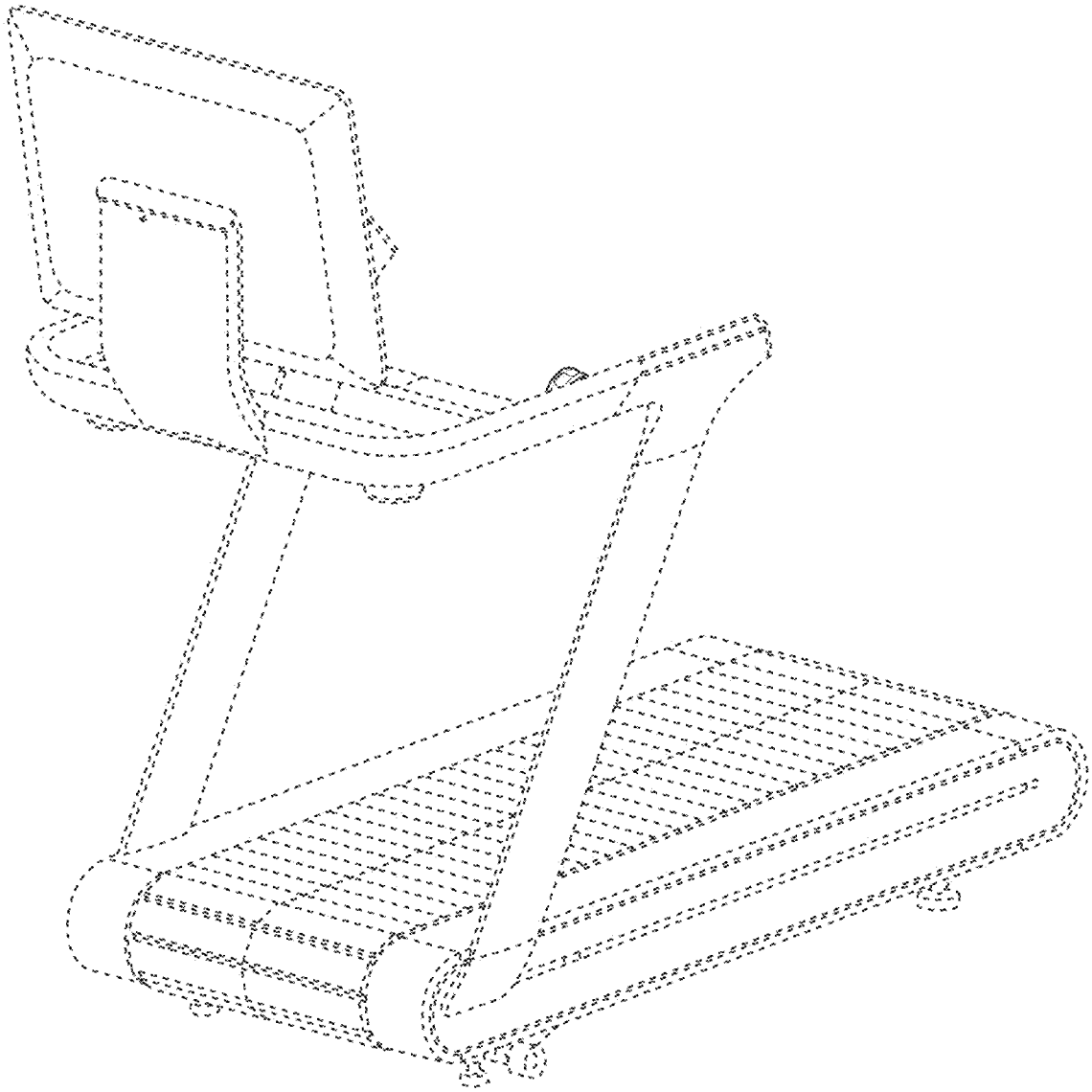
Figure 5:
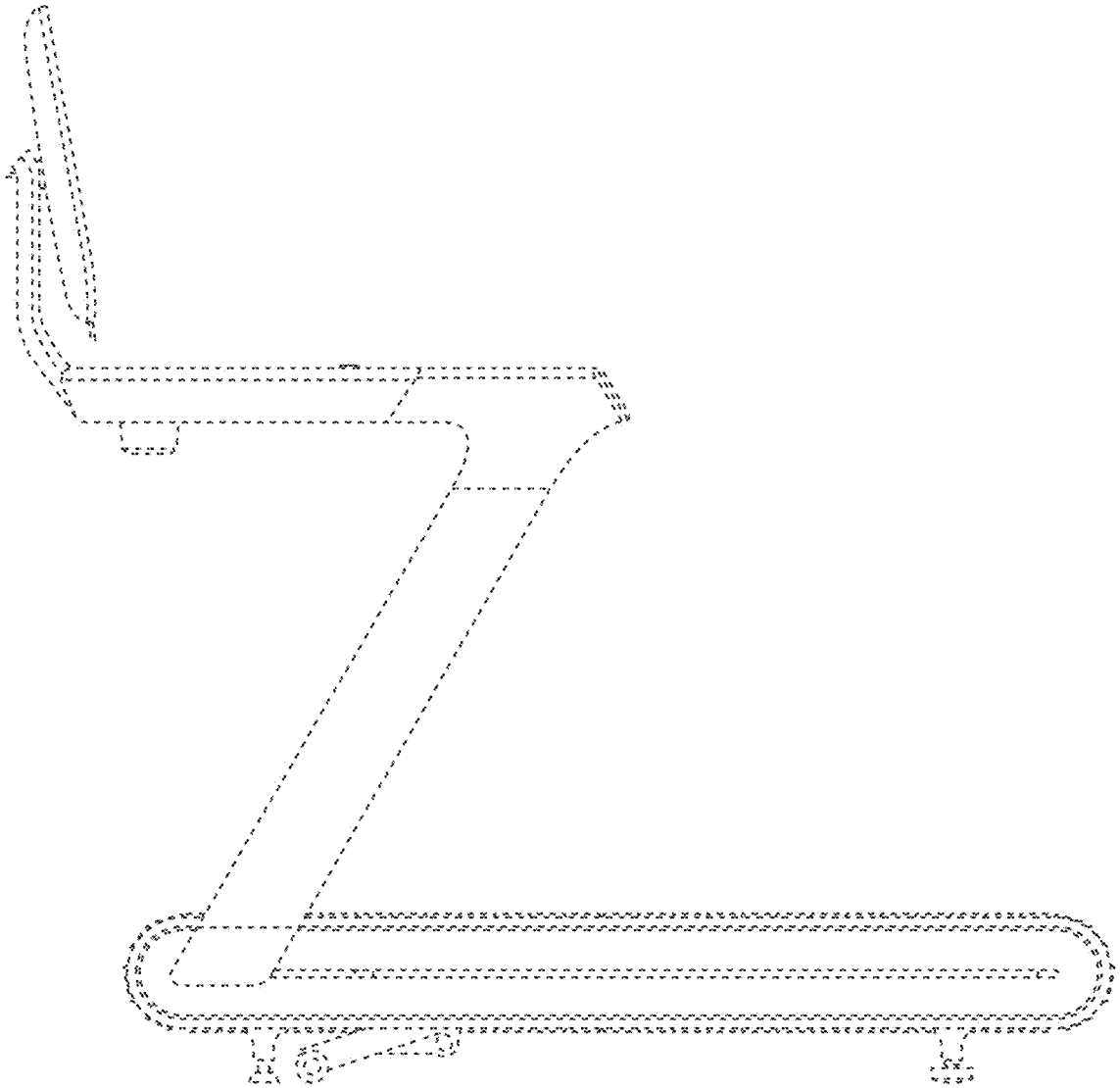
Figure 8:
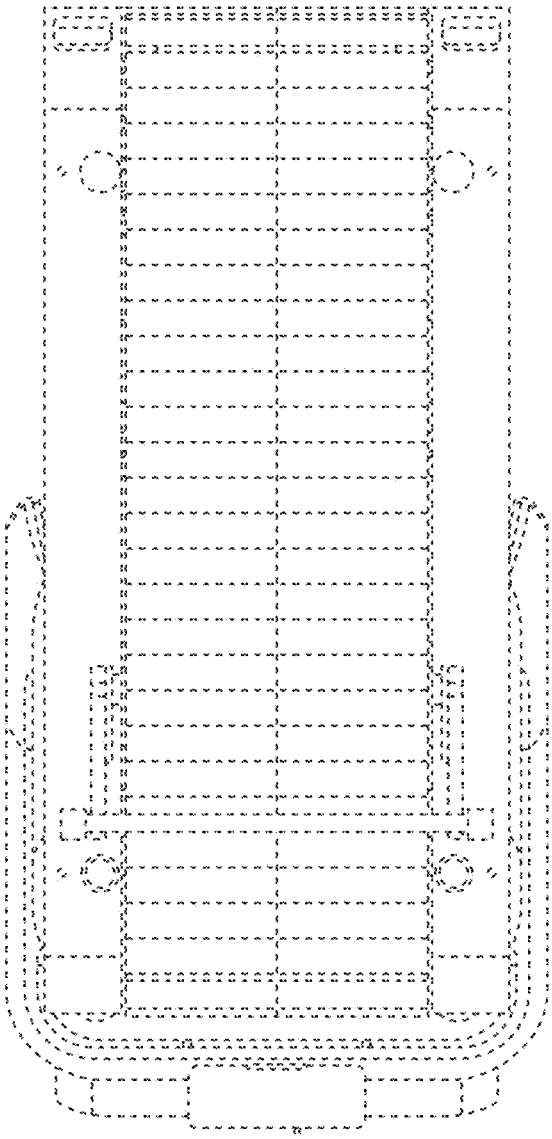
Figure 10:
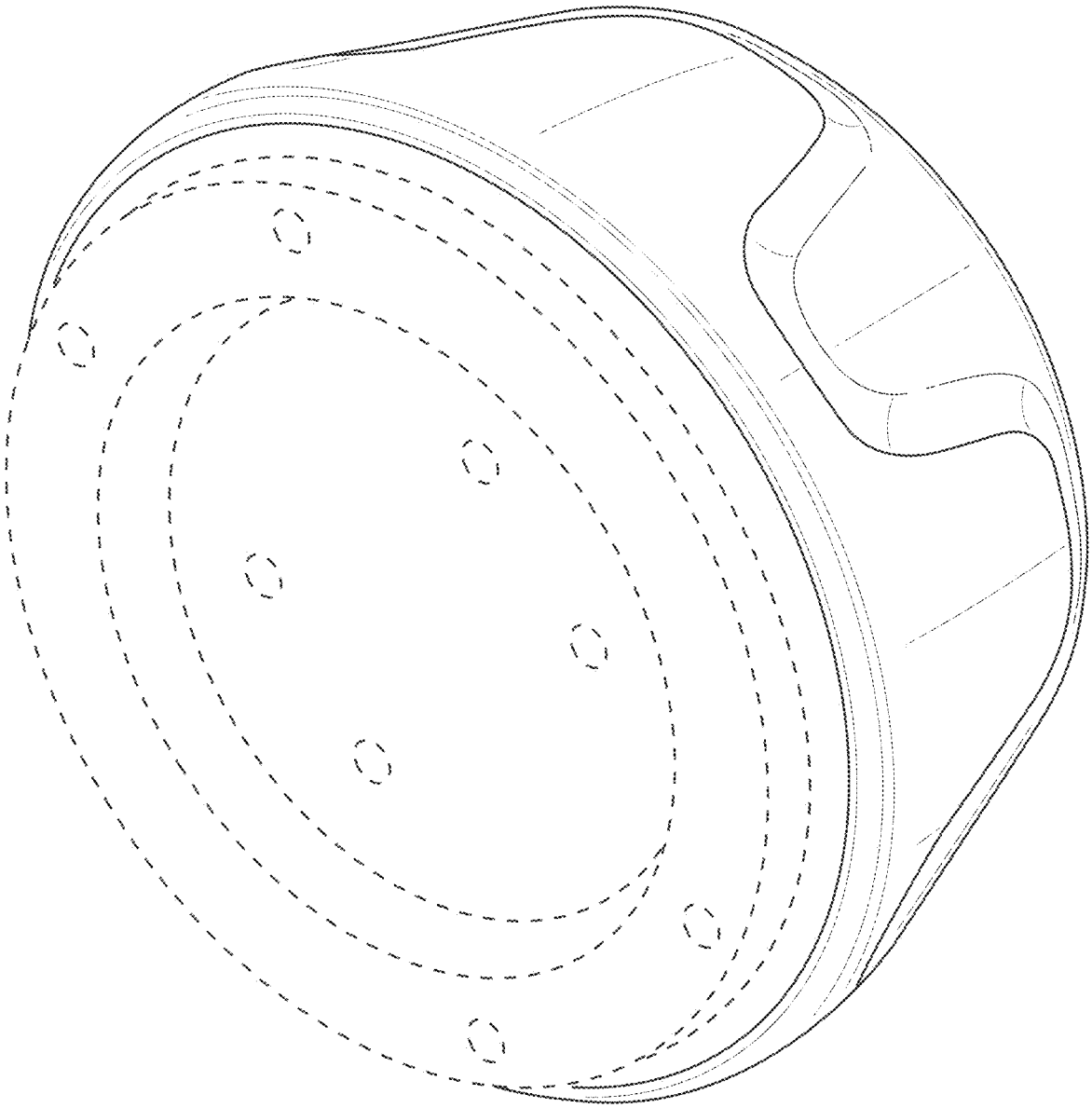
Figure 11:
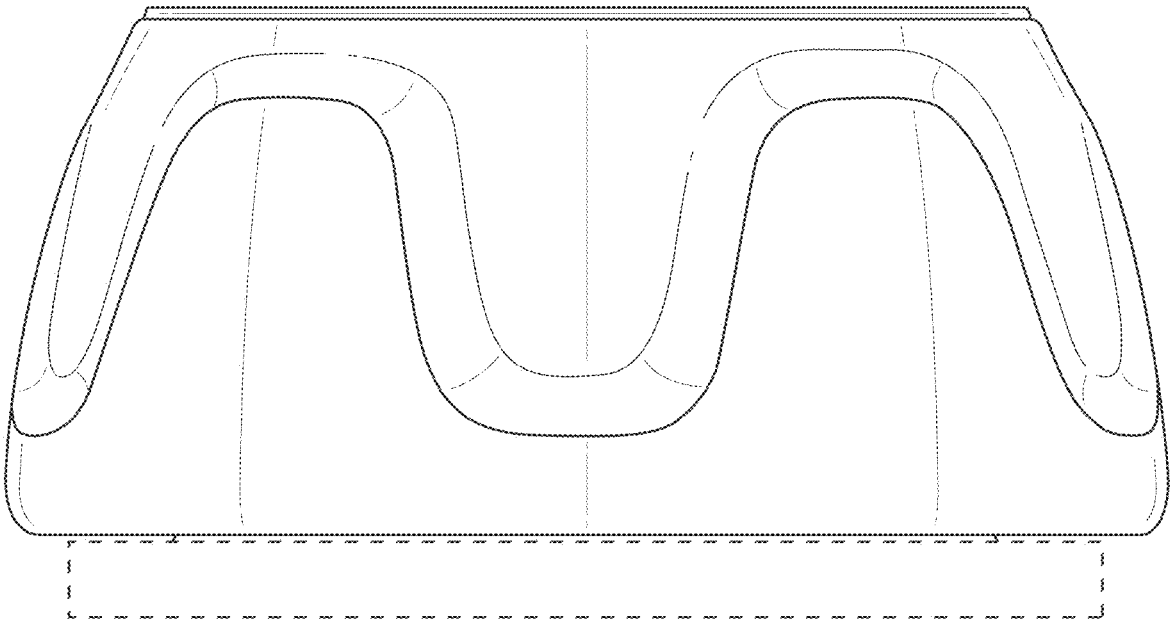
Figure 12:
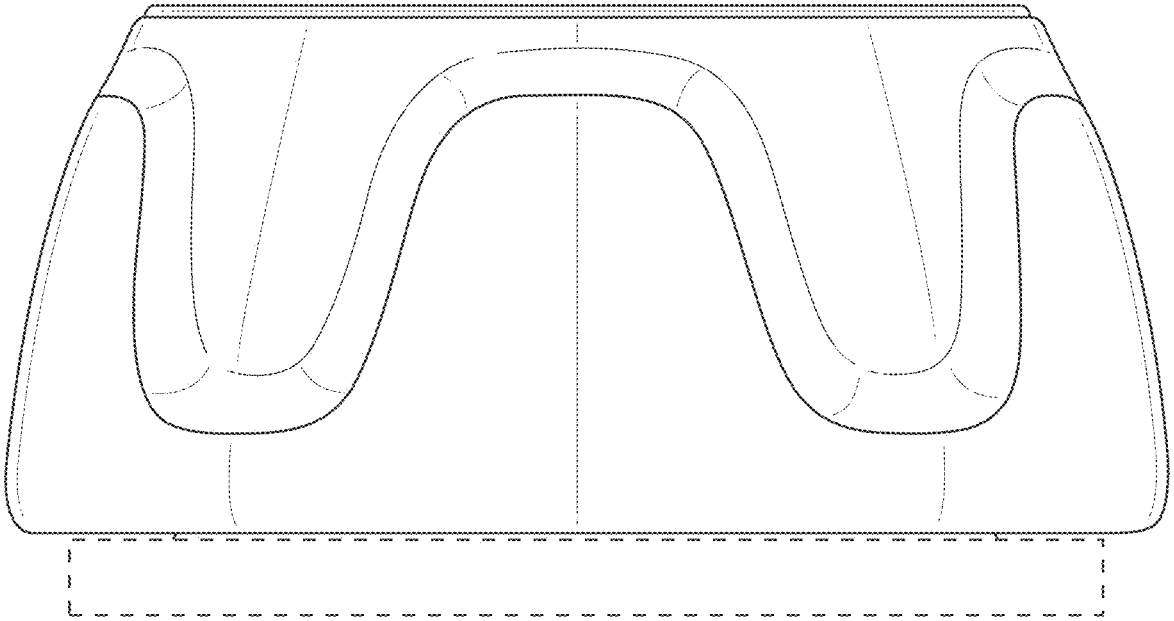
Figure 13:
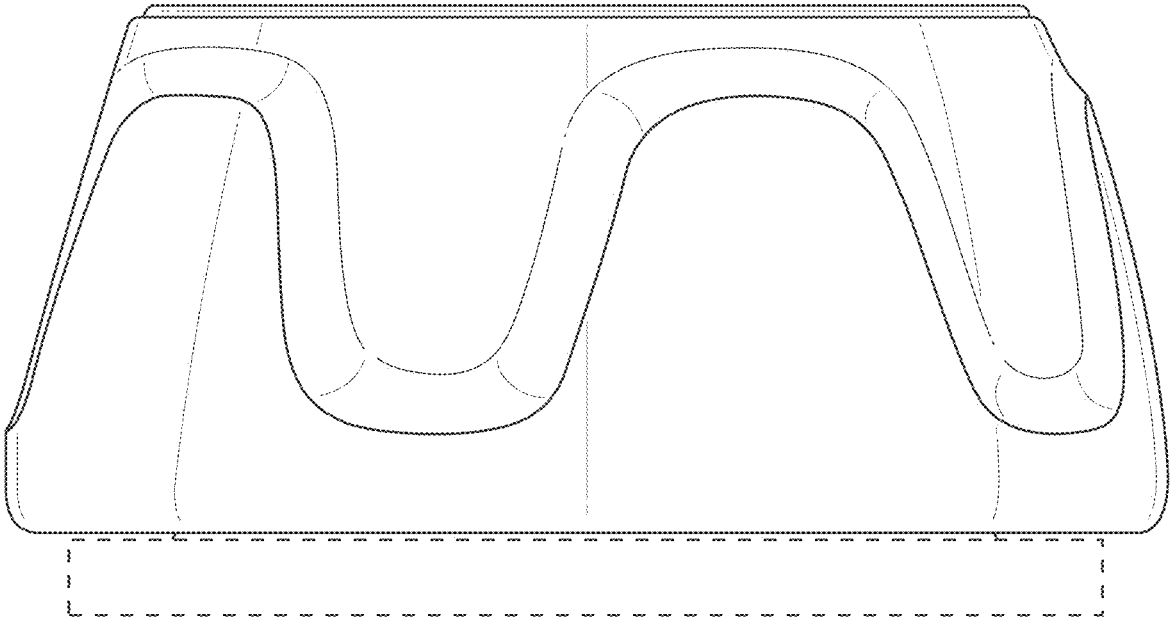

Matter enclosed in heavy brackets [ ] appears in the original patent but forms no part of this reissue; matter printed in italics indicates the additions made by reissue.

Related U.S. Application Data division of application No. 29/692,629, filed on May 28, 2019, now Pat. No. Des. 875,856, which is a division of application No. 29/632,278, filed on Jan. 5, 2018, now Pat. No. Des. 854,101.

(58) Field of Classification Search
CPC . A63B 21/023; A63B 21/225; A63B 21/4035; A63B 22/02; A63B 22/025; A63B 22/0046
See application file for complete search history.

(56) References Cited

U.S. PATENT DOCUMENTS

D333,887 S 3/1993 Dowler
5,411,279 A 5/1995 Magid
5,470,293 A 11/1995 Schonenberger
5,527,241 A 6/1996 Peng
5,538,489 A 7/1996 Magid
D374,260 S 10/1996 Snyderman et al.
5,577,598 A 11/1996 Schoenenberger
5,709,632 A 1/1998 Socwell
5,897,461 A 4/1999 Socwell
D416,060 S * 11/1999 Angeles ..... D8/312
6,042,514 A 3/2000 Abelbeck
6,053,848 A 4/2000 Eschenbach
6,095,952 A 8/2000 Ali et al.
6,123,647 A 9/2000 Mitchell
6,146,315 A 11/2000 Schonenberger
6,180,210 B1 1/2001 Debus
D445,152 S 7/2001 Wang et al.
6,348,025 B1 2/2002 Schonenberger
D461,876 S * 8/2002 Green ..... D23/250
D472,947 S * 4/2003 Wu ..... D8/312
D484,554 S 12/2003 Hellman, Jr. et al.
D492,559 S * 7/2004 Itano ..... D8/51
6,918,859 B1 7/2005 Yeh
D579,992 S 11/2008 Cesaroni
D590,232 S * 4/2009 Demers ..... D8/107
D600,094 S * 9/2009 Hwang ..... D8/312
7,976,437 B1 7/2011 von Detten
8,308,619 B1 11/2012 Astilean
D673,020 S * 12/2012 Brummitt ..... D8/14.1
8,343,016 B1 1/2013 Astilean
D676,551 S * 2/2013 Desai ..... D24/129
D707,763 S 6/2014 Cutler
D709,147 S 7/2014 Oransky
8,920,347 B2 12/2014 Bayerlein et al.
9,039,579 B1 5/2015 Osime
9,044,637 B2 6/2015 Karl
D751,156 S 3/2016 Tasca et al.
D755,029 S * 5/2016 Myers ..... D8/312
D763,976 S 8/2016 Vezeau et al.
9,694,234 B2 7/2017 Dalebout et al.
10,010,748 B1 7/2018 Weinstein et al.
D827,058 S 8/2018 Lisi et al.
D827,733 S 9/2018 Hochstrasser
10,265,566 B2 4/2019 Bayerlein et al.
D849,501 S * 5/2019 Wilson, II ..... D8/312
10,299,988 B2 5/2019 Shin
D854,101 S 7/2019 Kruse et al.
D859,543 S 9/2019 Lisi et al.
D873,934 S 1/2020 Mino
D875,856 S 2/2020 Kruse et al.
10,556,168 B2 2/2020 Fima
10,625,137 B2 4/2020 Dalebout et al.
10,632,339 B2 4/2020 Chen
D888,715 S * 6/2020 Hendrickson ..... D14/432
10,668,321 B2 6/2020 Yoo
10,695,613 B2 * 6/2020 Chang ..... A63B 21/225
D890,594 S * 7/2020 Gao ..... D8/312
D902,332 S * 11/2020 Kruse ..... D21/669
D934,352 S * 10/2021 Li ..... D21/669
2005/0170935 A1 8/2005 Manser
2005/0255970 A1 * 11/2005 Wu ..... A63B 22/0228 482/54
2006/0160665 A1 7/2006 Tai
2007/0072743 A1 3/2007 Severino et al.
2007/0298937 A1 12/2007 Shah et al.
2008/0176719 A1 7/2008 To
2009/0215589 A1 8/2009 Schoenenberger
2010/0285929 A1 11/2010 Bayerlein et al.
2011/0152038 A1 6/2011 Freitag
2011/0266091 A1 11/2011 Taylor
2012/0157267 A1 6/2012 Lo
2012/0231934 A1 9/2012 Lo
2012/0270705 A1 10/2012 Lo
2014/0011642 A1 1/2014 Astilean
2014/0336010 A1 11/2014 Burger
2016/0023039 A1 1/2016 Cei
2016/0096064 A1 4/2016 Gatti
2016/0144225 A1 5/2016 Dalebout et al.
2016/0166877 A1 6/2016 Cei et al.
2016/0279465 A1 9/2016 Chang
2016/0367851 A1 12/2016 Astilean et al.
2017/0113093 A1 4/2017 Bellavista et al.
2017/0312566 A1 11/2017 Chang
2017/0312582 A1 11/2017 Root, Jr.
2018/0001134 A1 1/2018 Bayerlein et al.
2018/0056132 A1 3/2018 Foley et al.
2018/0104534 A1 4/2018 Erkelenz et al.
2018/0111018 A1 4/2018 Lee
2018/0126249 A1 5/2018 Consiglio et al.
2018/0140896 A1 5/2018 Chen
2018/0140903 A1 5/2018 Poure et al.
2018/0264315 A1 9/2018 Chen
2019/0060705 A1 2/2019 Yoo
2019/0118030 A1 4/2019 Yoo
2019/0126093 A1 5/2019 Yoo
2019/0168066 A1 6/2019 Yoo et al.
2019/0168067 A1 6/2019 Bates et al.
2019/0192952 A1 6/2019 Powell
2019/0217182 A1 7/2019 Kueker et al.
2019/0255382 A1 8/2019 Rudelstorfer
2019/0290956 A1 9/2019 Ren
2020/0094105 A1 3/2020 Kueker

OTHER PUBLICATIONS

"Designing Fitness Technology: An Interview with Peloton." Engineering.com., Nov. 10, 2021 [online], [retrieved on Jun. 24, 2024]. Retrieved from the Internet <URL: https://www.engineering.com/designing-fitness-technology-an-interview-with-peloton/>.*

* cited by examiner

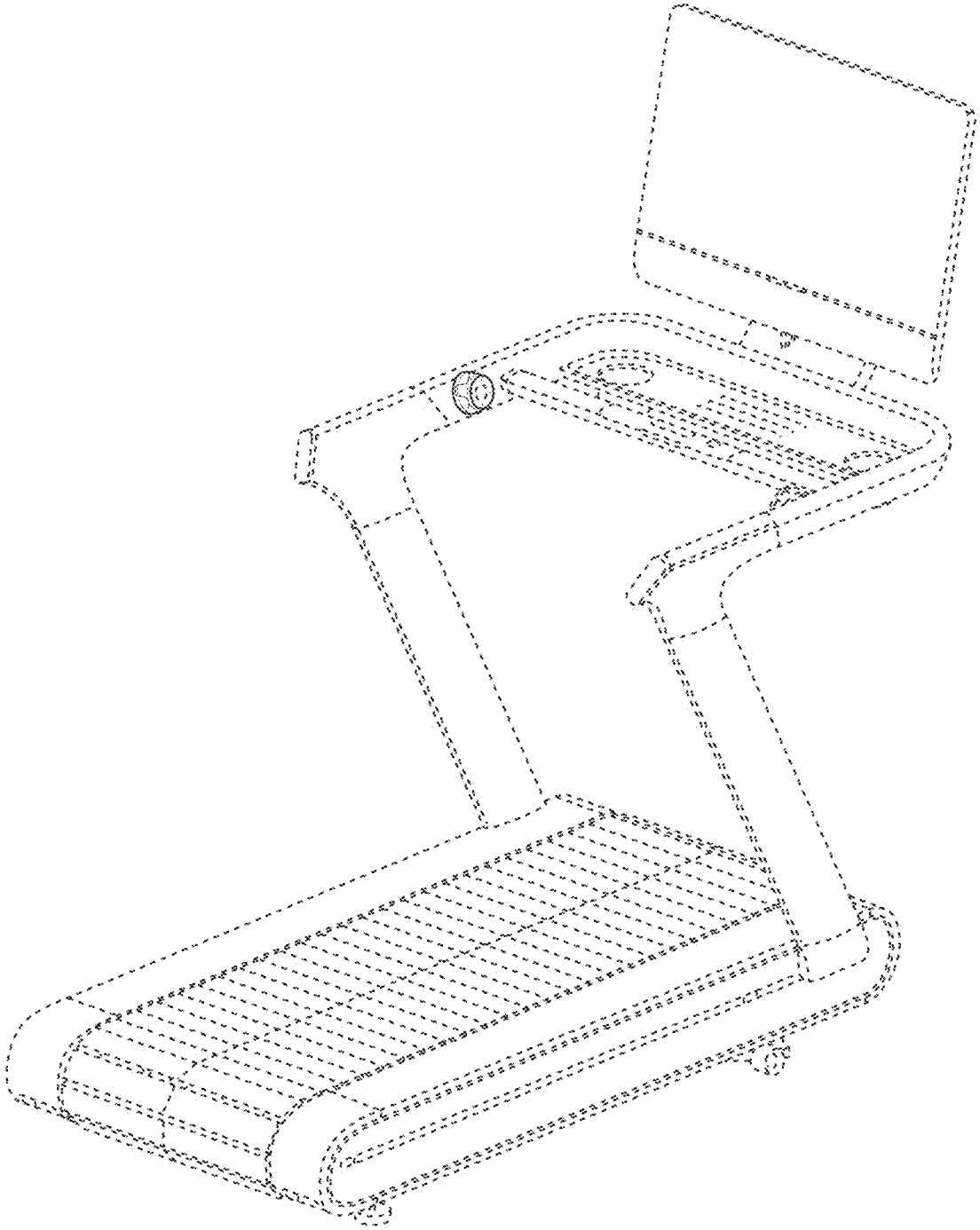
FIG. 1
AMENDED

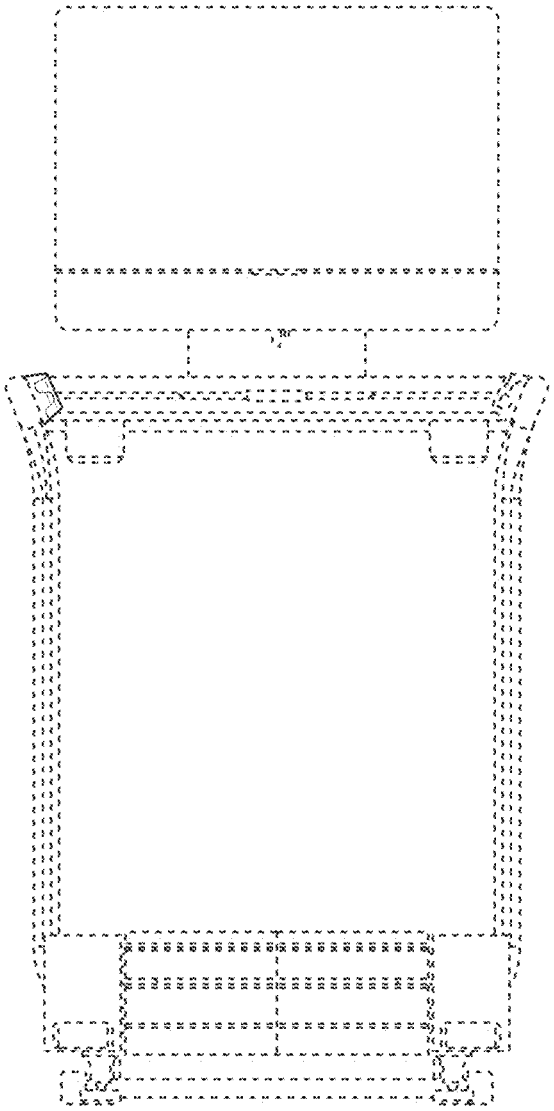
FIG. 3
AMENDED

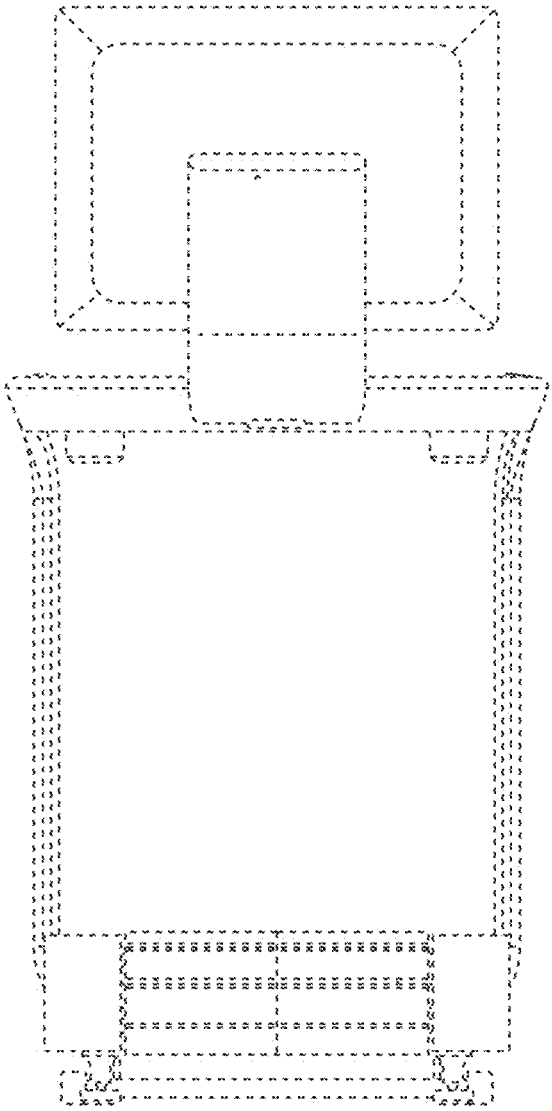
FIG. 4
AMENDED

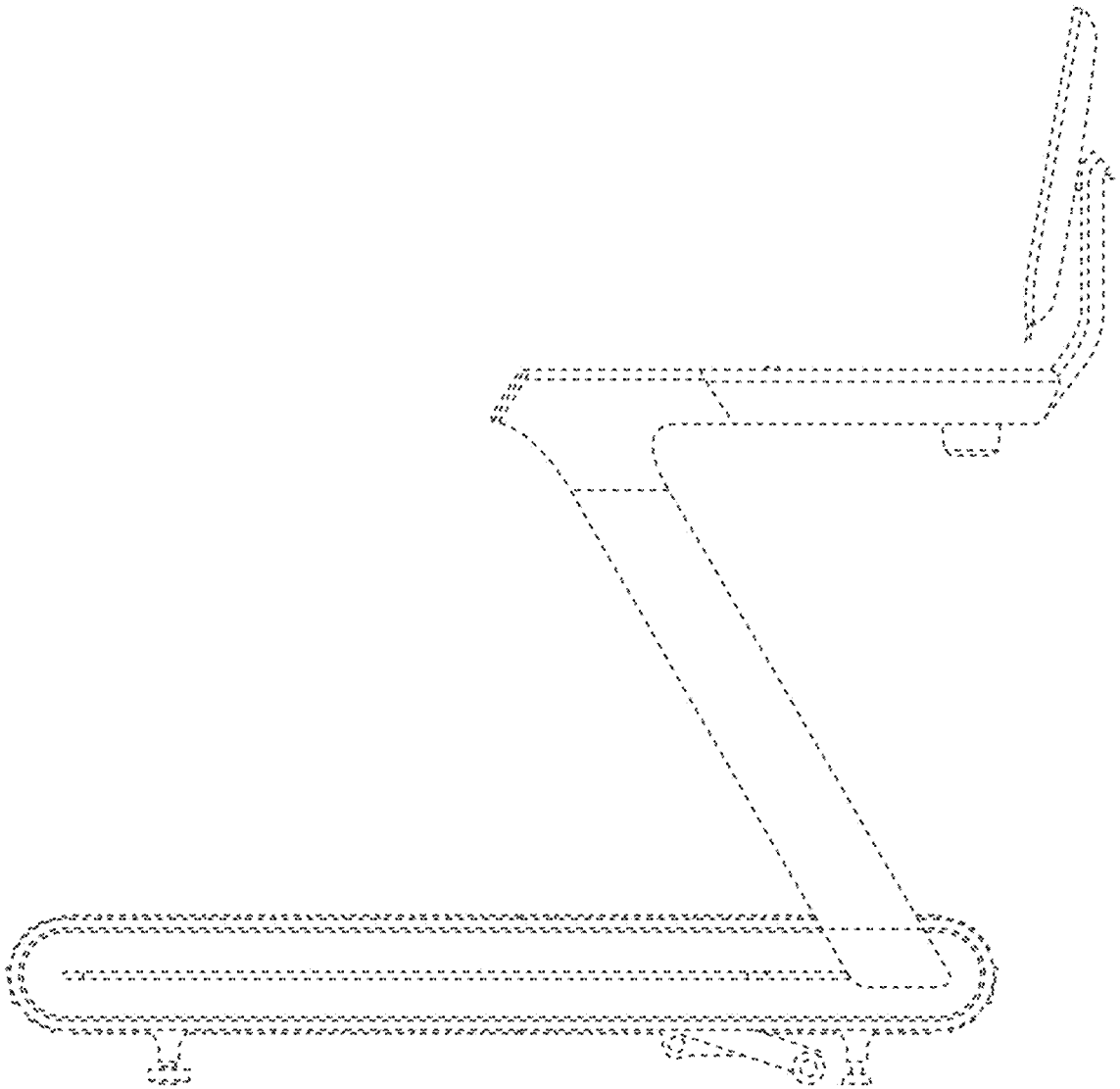
FIG. 6
AMENDED

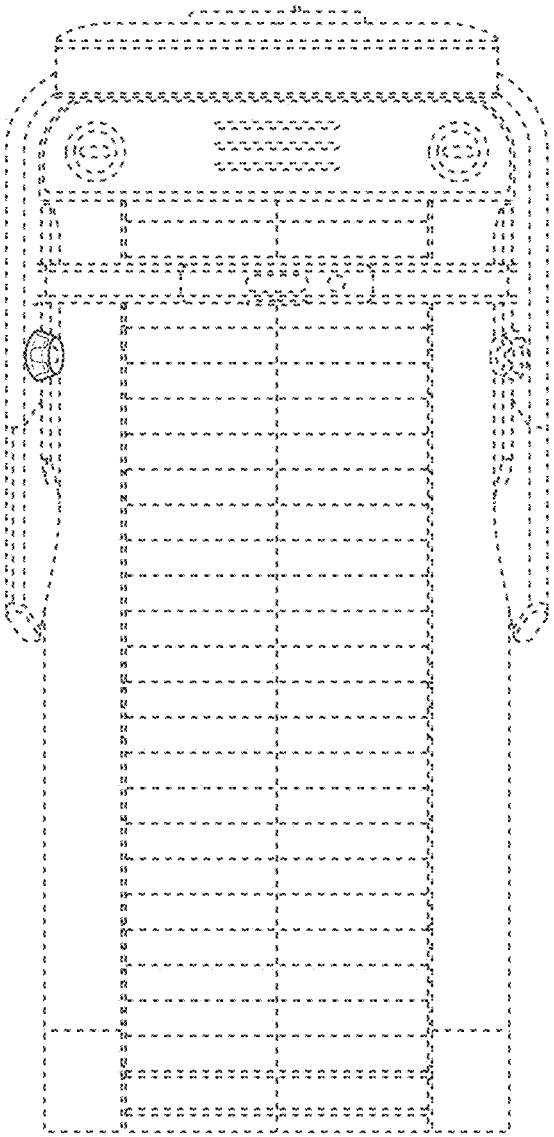
FIG. 7
AMENDED

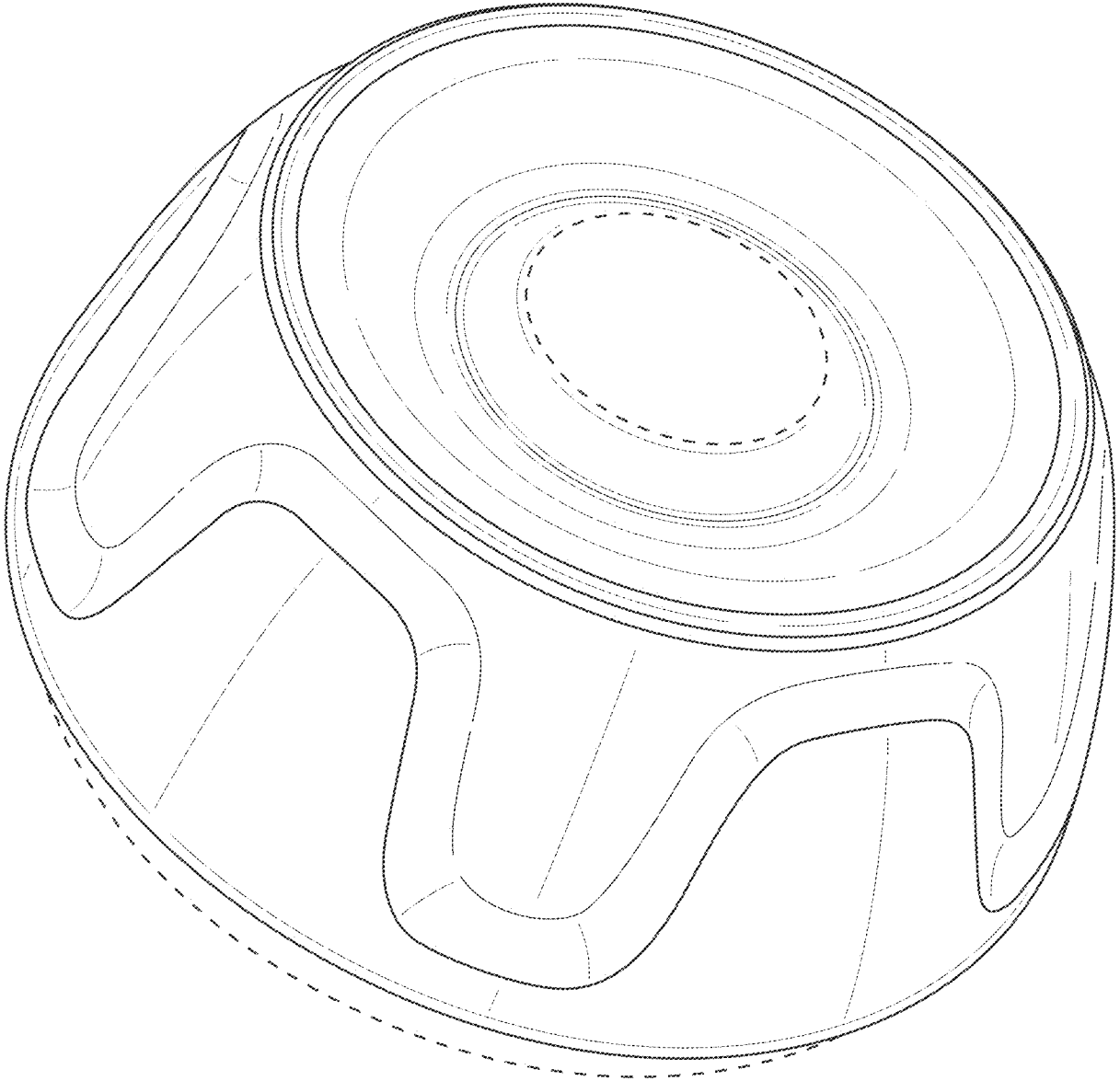
FIG. 9
AMENDED

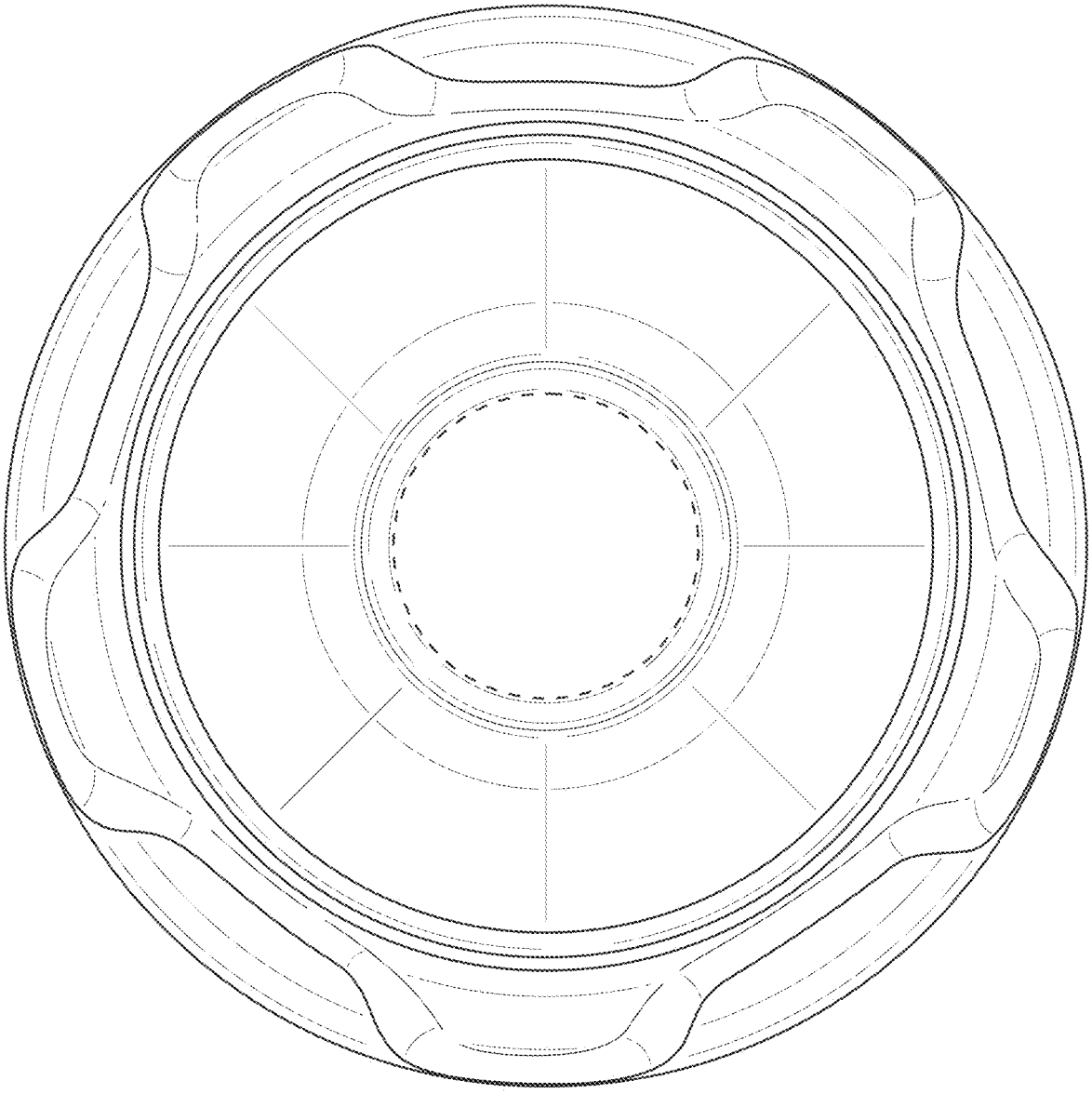
FIG. 14
AMENDED

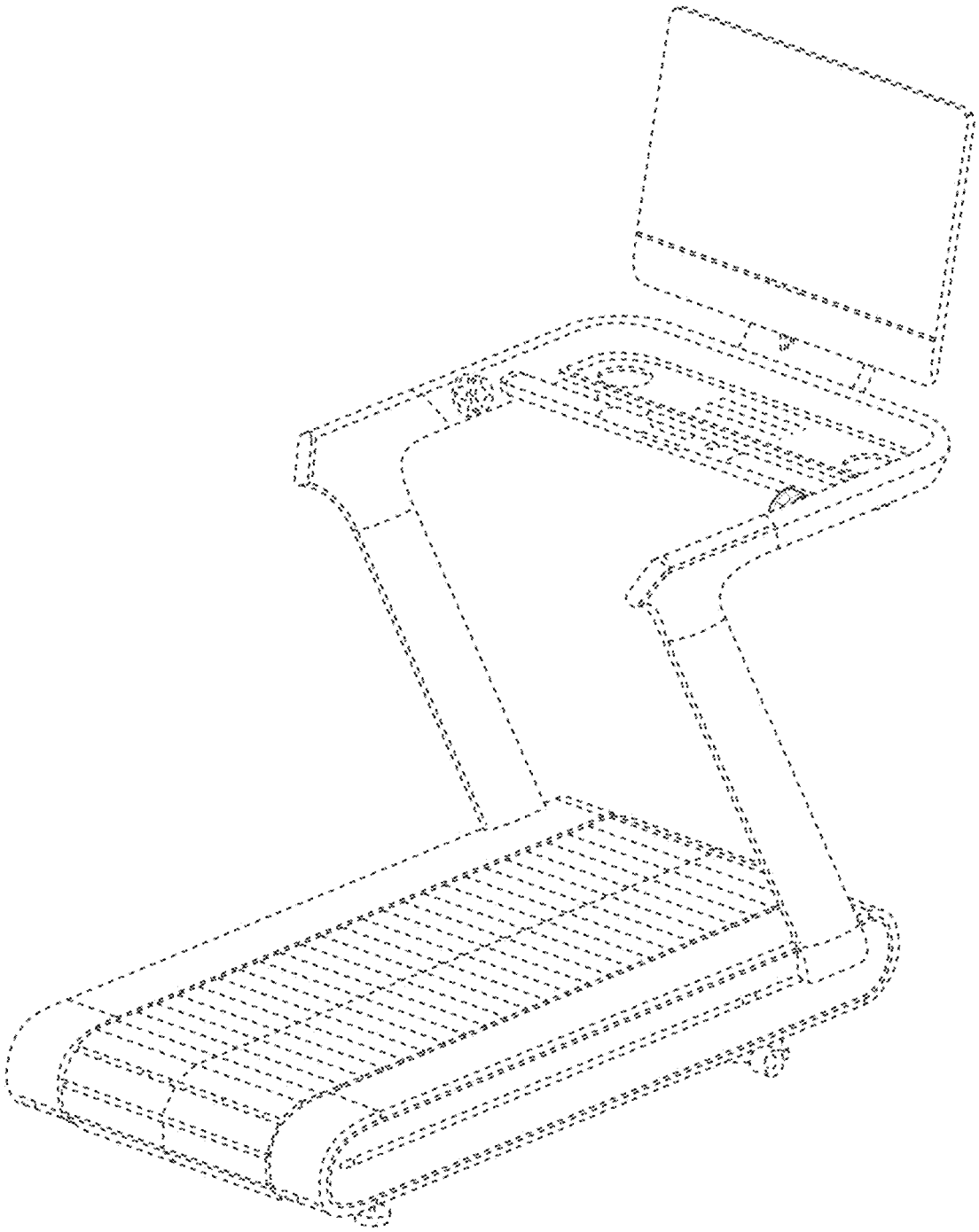
FIG. 15
NEW

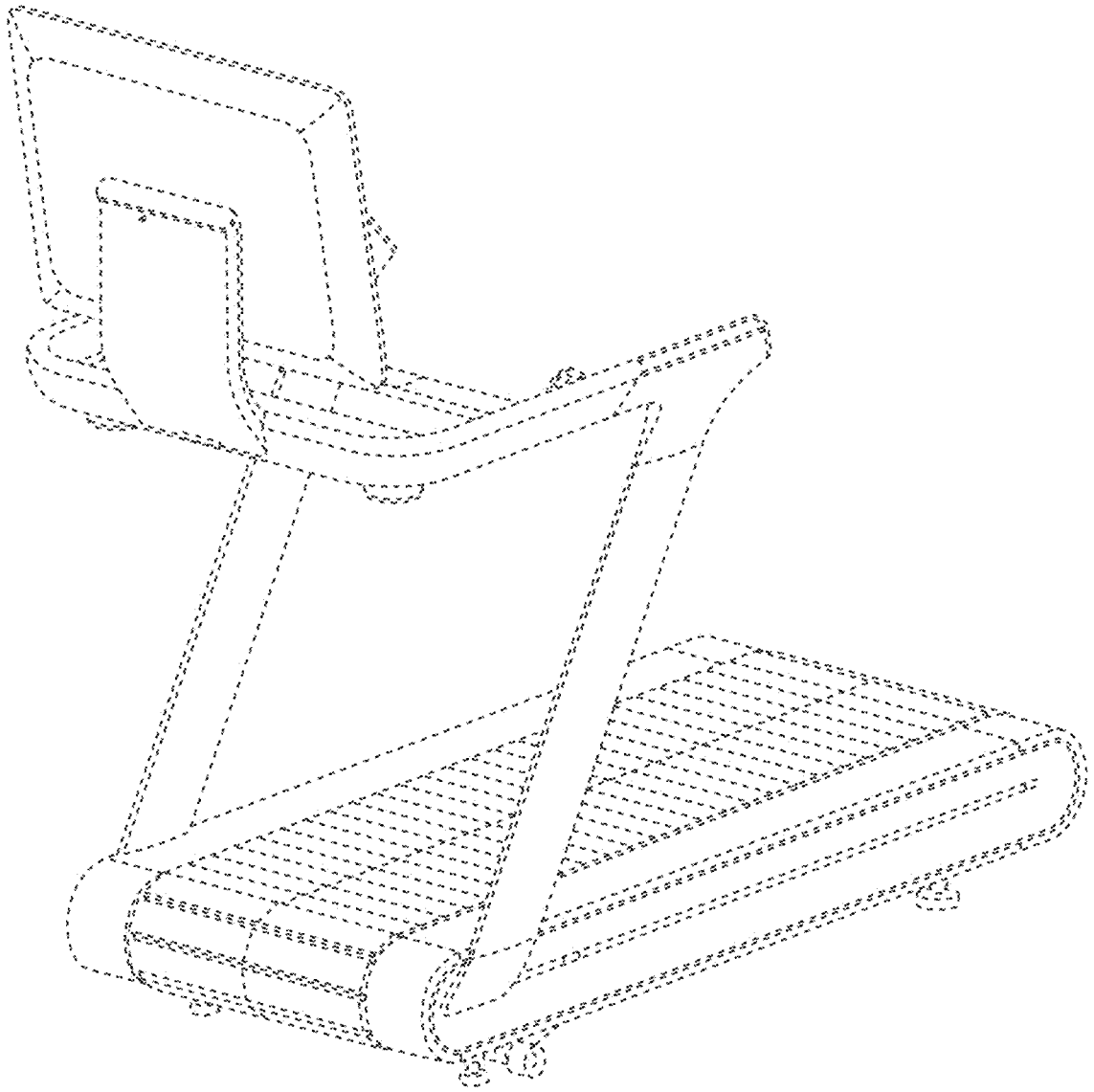
FIG. 16
NEW

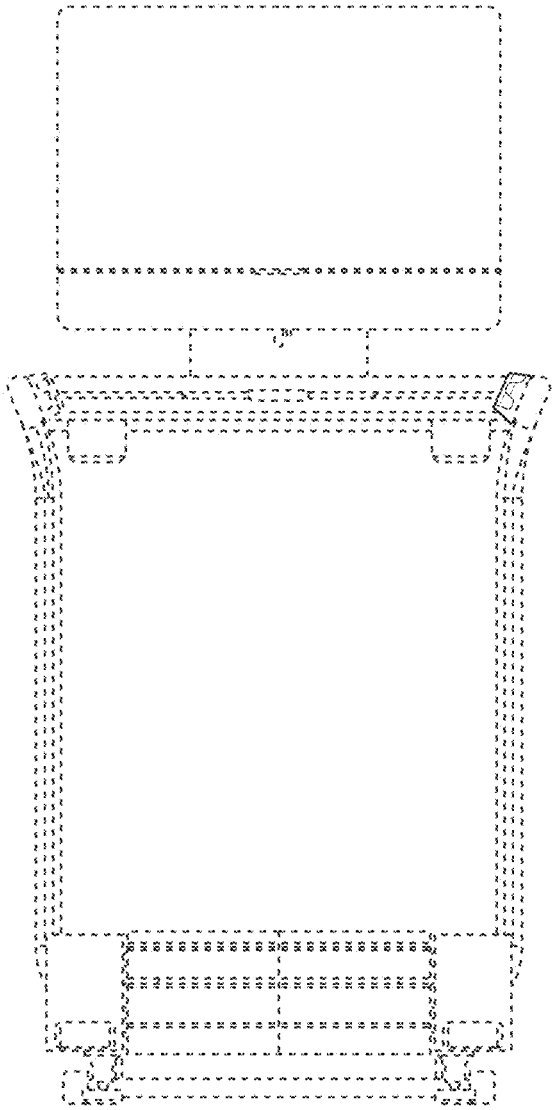
FIG. 17
NEW

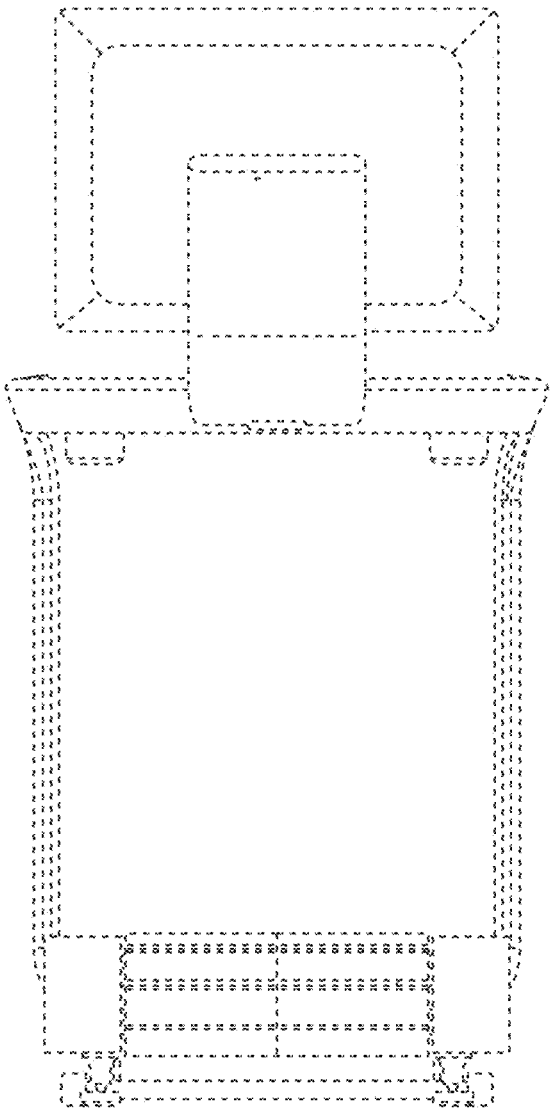
FIG. 18
NEW

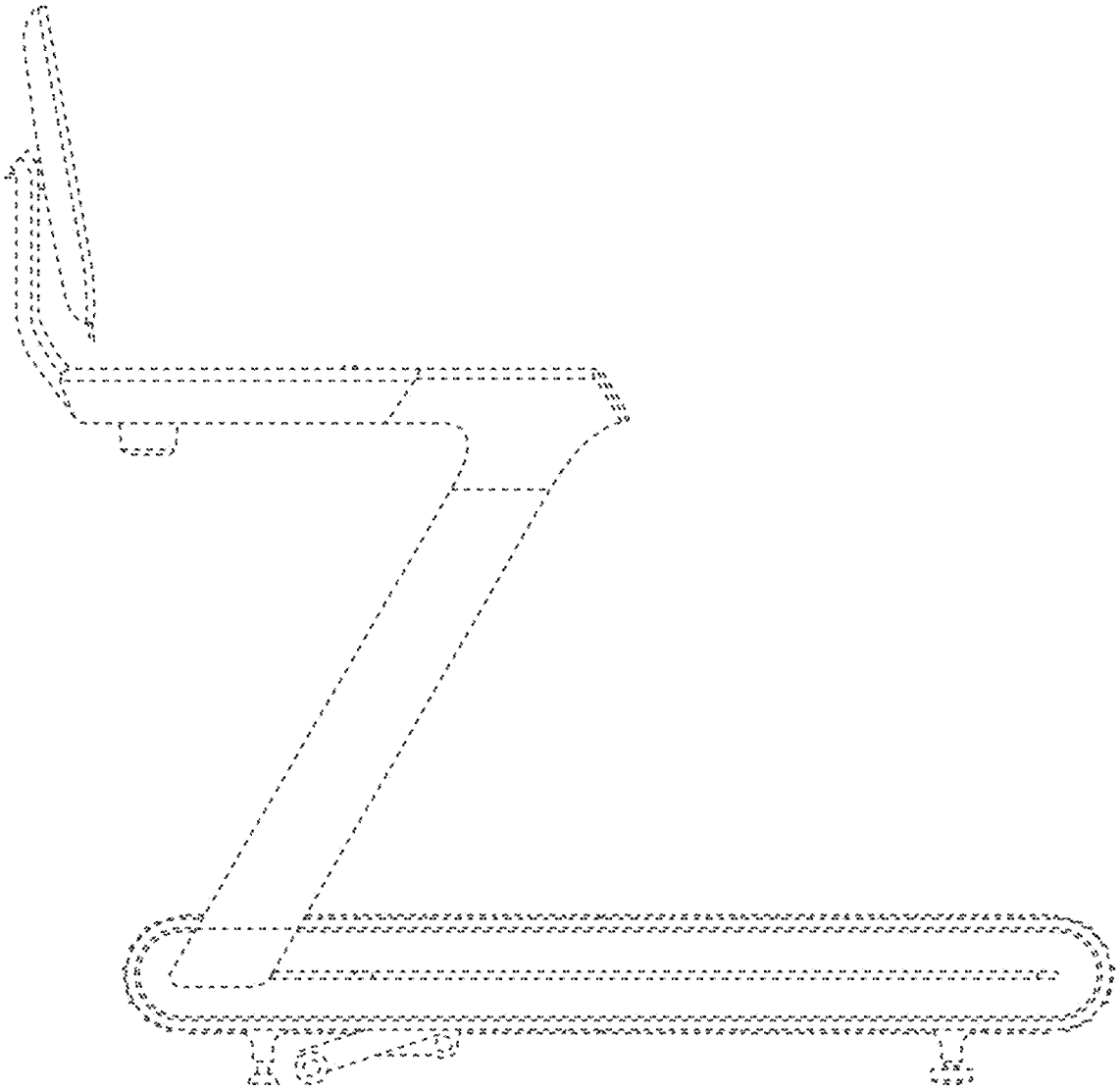
FIG. 19
NEW

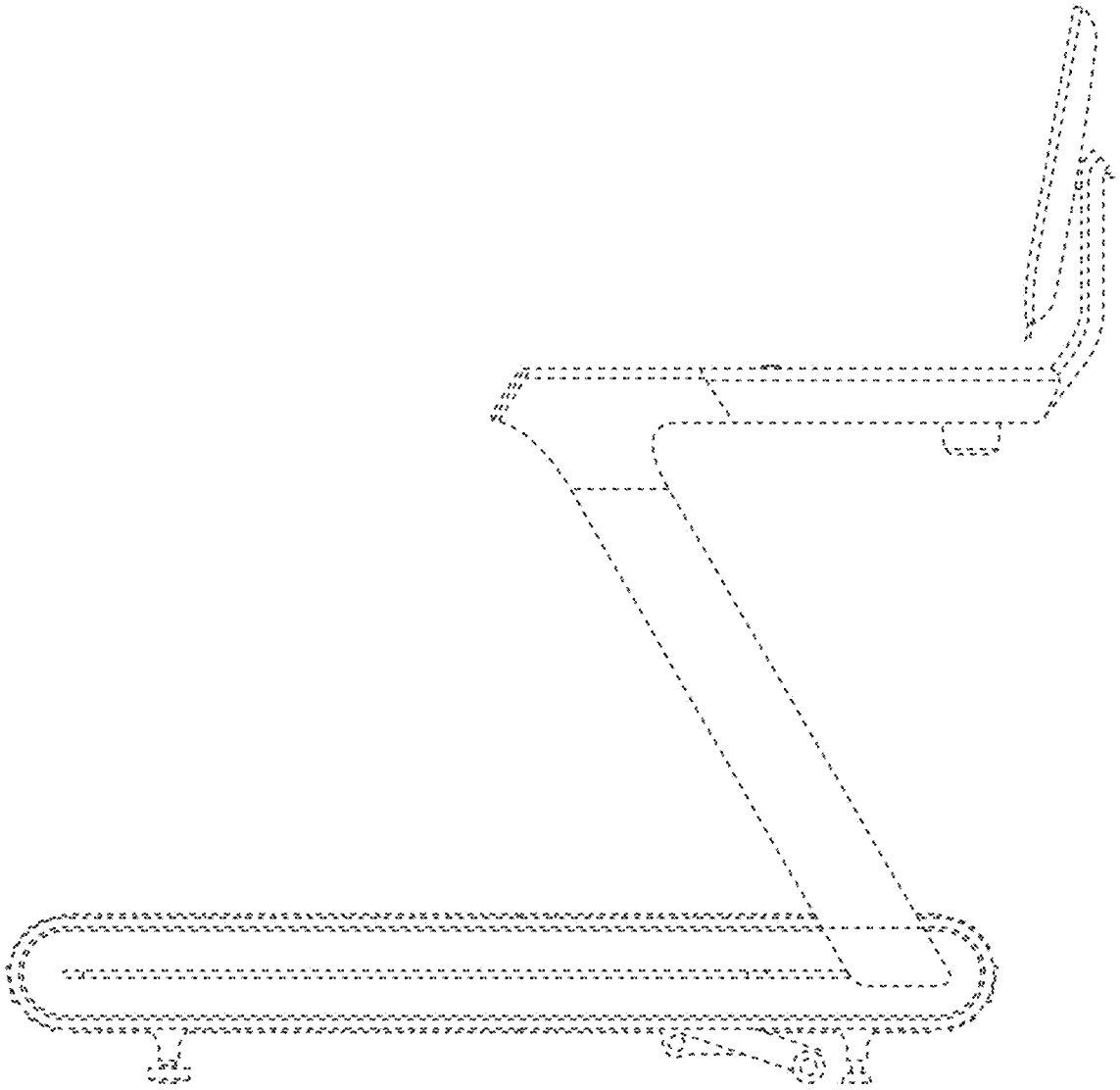
FIG. 20
NEW

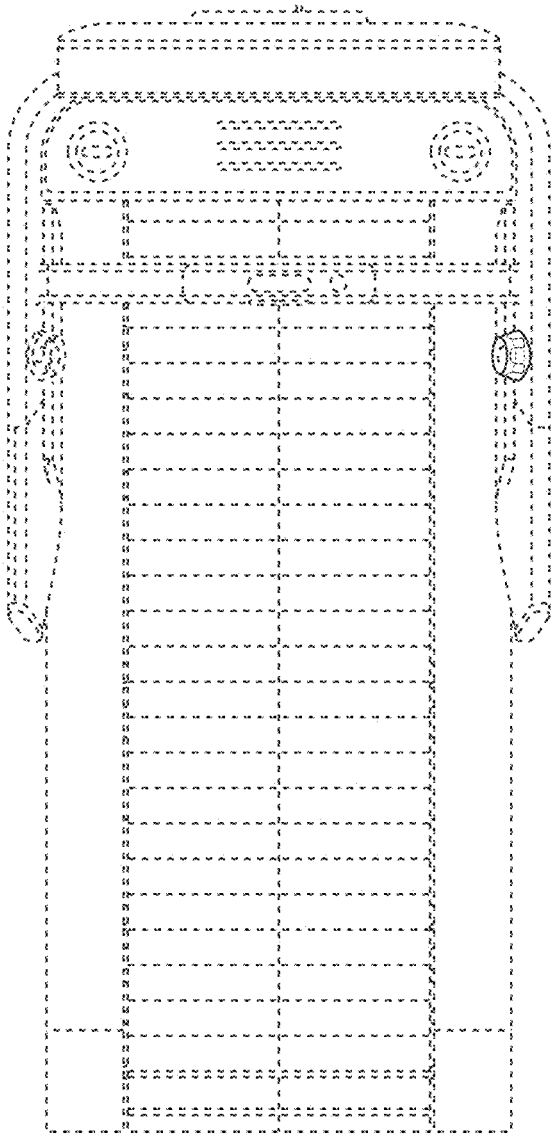
FIG. 21
NEW

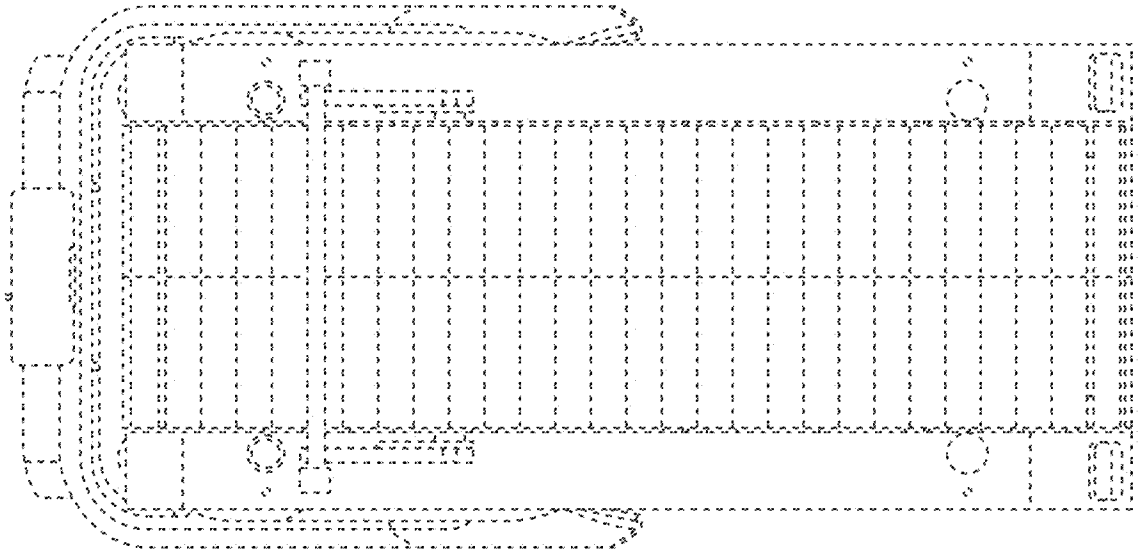
FIG. 22
NEW